July 2, 1940.
D. D. TAYLOR ET AL
2,206,207
BREAD SLICING EQUIPMENT
Filed Dec. 14, 1939
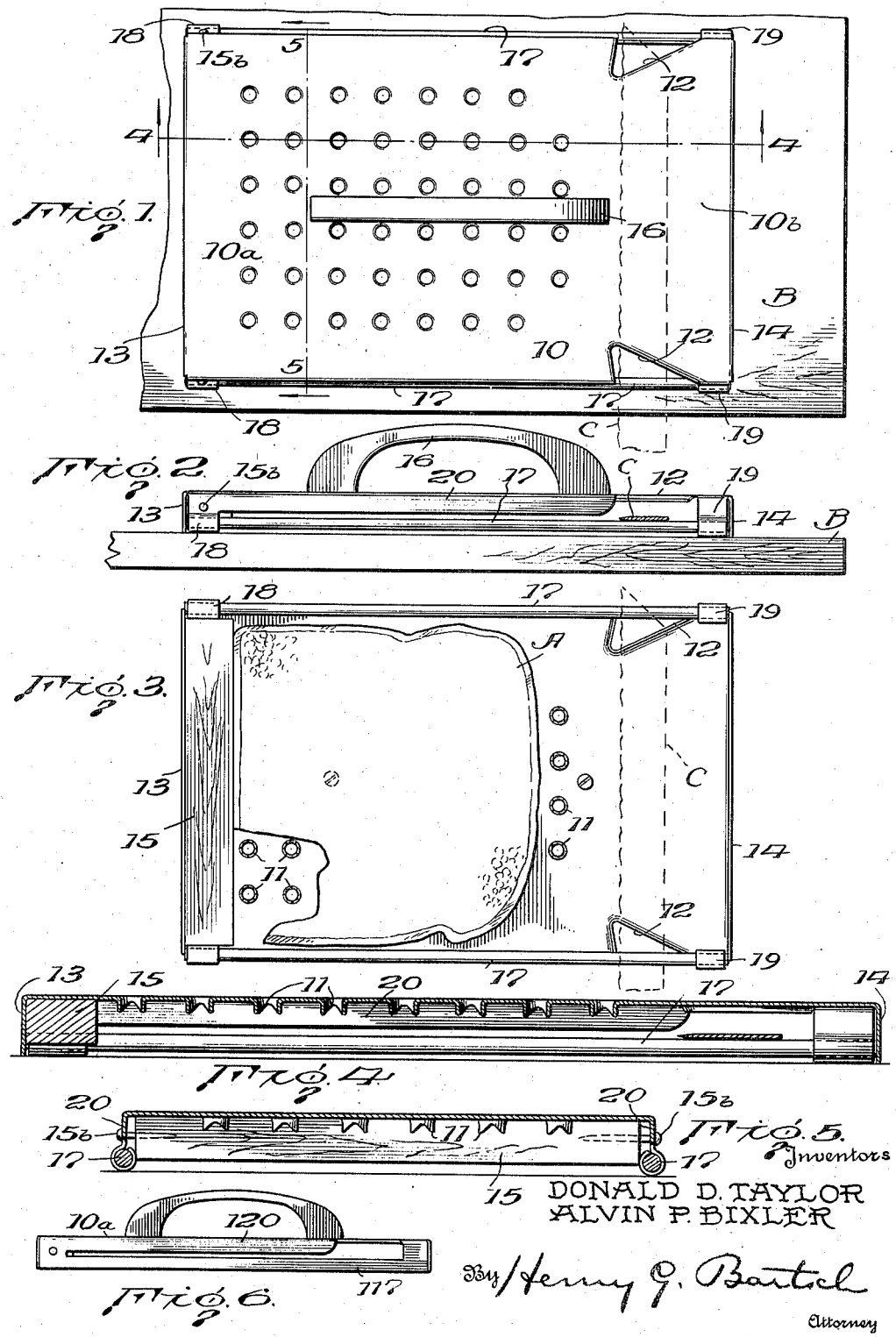

Patented July 2, 1940

2,206,207

UNITED STATES PATENT OFFICE 2,206,207

BREAD SLICING EQUIPMENT

Donald D. Taylor, Duncannon, and Alvin P. Bixler, New Buffalo, Pa.

Application December 14, 1939, Serial No. 309,275

2 Claims. (Cl. 146—150)

Our invention relates to improvements in bread slicing equipment and has to do, more particularly, with the provision of a novel device through the use of which conventional machine-cut bread slices may be further divided to a thickness of one-quarter of an inch, the thickness regarded as that most acceptable for the making of dainty party sandwiches, Melba toast and the like.

The difficulty of slicing fresh bread is well known to housewives and, as a consequence, much of the bread now marketed has been pre-sliced at the bakery to a standard thickness of one-half inch which, while a desirable thickness for general table use and heavy sandwiches, is not suitable for many other purposes such as party sandwiches, canapes and the like.

Devices for the slicing of a one-half inch slice of bread into two slices of one-quarter inch thickness have been marketed and have enjoyed substantial retail acceptance, but they have embodied certain unavoidable limitations among which are bulkiness, substantial weight, considerable cost to manufacture, and the requirement of an appreciable degree of care on the part of the operator to avoid tearing the thin slices during removal from the plates upon which they are impaled.

The device of the present invention distinguishes itself from those, above-mentioned, in that the bisected slices are more readily removed and need for especial care is avoided.

Moreover, the device of the present invention is of simple and durable construction capable of economical manufacture and can be produced in one rigid piece by stamping and pressing from a single sheet-metallic blank, or by molding from plastic composition.

The device of the present invention is further advantageously distinguished from that heretofore known and available in that it is more compact, permitting shipment or storage in less space; in that it is free from hinged joints, rendering it less subject to injury by dropping or other abuse; in that it is lighter in weight, permitting simplified and less expensive packaging for shipping purposes; and in that the knife employed therewith need not be removed each time a slice has been bisected in order to permit placement of a fresh slice.

The foregoing advantages, inherent in constructions embodying the several concepts of the present invention, constitute the objects to which it is directed.

Further objects, and objects relating to economics of construction and details of use will more definitely appear to those skilled in the art upon familiarization with the detailed description to follow. In one instance, we accomplish the objects of our invention by the means and methods set forth in the following specification. Our invention is clearly defined in the appended claims. One structure constituting a preferred embodiment of our invention is illustrated in the accompanying drawing forming a part of this specification, in which:

Figure 1 is a top plan view of a device embodying the invention disclosed in appropriate association with a conventional bread-board and bread knife, the associated knife blade being shown in broken lines;

Fig. 2 is a view of the same device, in side elevation, the knife blade being shown in cross section;

Fig. 3 is a bottom plan view of the same device, illustrating a bread slice associated therewith;

Fig. 4 is an enlarged longitudinal sectional view of the device taken on the line 4—4 of Fig. 1;

Fig. 5 is an enlarged transverse sectional view of the device taken on the line 5—5 of Fig. 1; and Fig. 6 is a view, in side elevation and on a smaller scale, of a modified form of the invention in which the bread knife guiding means are constituted by a pair of longitudinally-slotted flanges formed from the same blank as the plate member.

The same reference numerals refer to the same parts throughout the several views.

In a broad sense, our invention finds embodiment in a device for facilitating the laminar bisection of a conventional slice of baker's loaf bread into two similar slices each of one-half standard thickness, which device is intended for use upon a conventional bread-board and consists of a plate member provided with a generally flat undersurface adapted for firm direct engagement with the top surface of a slice of bread flatly disposed directly upon the plane surface of the bread-board. Means are provided integral with the plate member, and marginally arranged with respect thereto, which means directly support the plate member upon the surface of the bread-board so as to definitely maintain the undersurface of the plate member elevated above the board a fixed, uniform distance such that a conventional bread slice interposed between the supported plate and the bread-board will be placed under a slight degree of compression. Means are also desirably provided upon the undersurface of the plate member for increasing the frictional contact of the plate member with the bread slice and precluding lateral movements thereof during the cutting operation. In addition, guide means are provided integral with the plate member for receiving the blade of the bread knife and accurately directing cutting movements thereof along a plane parallel to the undersurface of the plate member and definitely spaced therefrom a distance equal to substantially one-half of the thickness of the bread slice to be bisected. These guide means, in accordance with the present invention, comprise a pair of bread-knife-supporting rails, one disposed along each of two opposite side edges of the plate member. The two rails are each secured to the plate member solely at their ends, so as to provide intermediate or span portions upon which the lower cheek of the inserted bread knife may ride with facility during manual cutting movements applied thereto. The two span portions of the said rails are disposed in a common plane and the top edges of said span portions lie in a common plane parallel to the undersurface of the plate member, which plane is spaced from the plane of the plate member's undersurface a distance substantially one-half the thickness of the bread slice to be bisected. Preferably, though not essentially, the guide means include a longitudinal member overlying each rail in uniform, spaced relation thereto, which longitudinal members, by virtue of their closely spaced relationship to the rails, positively restrict the inserted knife blade to flatwise disposition upon the rails.

The above-defined structure is fabricated into a substantially rigid, non-articulated organization. The longitudinal members, as well as the rails with which they cooperate for blade guidance are desirably formed from the same single piece of stock as the plate member. However, for enabling manufacture with a minimum of die operations, these parts may be formed separately and assembled by riveting or welding operations. Similarly, while the devices disclosed in the accompanying drawing are formed from metallic sheet and wire stock, the device is susceptible of manufacture in wood or plastics by molding and other operations well known in the art.

Referring, now, to the accompanying drawing in which we have disclosed a device constituting a preferred embodiment of our invention, the device consists of a plate member 10 formed from thin sheet metal by suitable die operations, which plate member is divided into what may be termed a major area 10a and a minor area 10b. The major area of the plate is of a size and configuration such as to be able to completely overlie a conventional slice A of baker's loaf bread flatly disposed upon a conventional bread-board B. The major area 10a is preferably studded with a multiplicity of bread-slice-engaging studs 11 which preclude lateral displacements of the bread slice relative to the undersurface of the plate. The minor area 10b of the plate member is preferably not so studded, but is provided, at each side thereof, with cut-out openings 12, the purpose of which will later be explained.

In order to insure properly spaced disposition of the undersurface of the plate member area 10b with respect to the surface of the breadboard, the illustrated device is provided with depending end flanges 13 and 14 constituting extensions of the ends of the plate member adjacent the areas 10a and 10b, respectively. A facing block 15, of wood or similar soft material, is provided upon the inner surface of the flange 13 and is secured thereagainst by assembly studs 15b associated with adjacent portions of the plate member. This block 15 serves as a stop upon which the bread knife, employed with the device, is brought to bear during the final portion of the cutting operation performed by it. A handle 16 is secured to the top surface of the plate member 10 and serves as a means by which the device may be maintained in association with the bread-board B, as well as the means by which the device may be properly placed upon and lifted from the successive bread slices.

By virtue of the accurately determined depth of the flanges 13 and 14, a bread slice overlain by the plate member portion 10a with its studs 11 will be slightly compressed and definitely held against lateral movement otherwise induced by cutting movements of the slicing knife. Guide means are provided in the illustrated device, for insuring laminar bisection of the bread slice into two substantially identical half-thickness slices. These guide means consist of a pair of rails 17, one disposed along each side edge of the plate member. These rails 17 are each secured at its termini to the plate member adjacent the respective flanges 13 and 14. In the illustrated embodiment of the invention the rails 17 are formed from stiff wire stock and are attached to the plate member by brackets 18, located adjacent the block 15, and brackets 19, depending from the minor plate portion 10b. The brackets 18 and 19 are of such shape and extent as to dispose the span portion of each rail 17 in parallelism with respect to the plate member, and the common plane of the topmost lines or surfaces of said span portions is fixedly maintained at a spacing, with respect to the undersurface plane of the plate member, equal to one-half the thickness of the conventional bread slice to be bisected. In addition to their function as mounts for the rail ends, the brackets 18 and 19 supplement the support afforded by the depending flanges 13 and 14 of the device, due to the disposition of their lowermost lines or surfaces in the plane common to the lower edges of the depending end flanges.

The span portions of the rails 17, extending, as they do, nearly to the ends of the plate member 10, serve as supports for flatwise disposition of the blade of a conventional bread knife during movements thereof essential to the bisection of the bread slice disposed beneath the major area 10a of the plate member. In order to insure such flatwise disposition of the knife blade with respect to the rails 17, the side edges of the major area 10a of the plate member are preferably extended downwardly in the form of a pair of depending flanges 20 which are closely and uniformly spaced with respect to the adjacent span portions of the rails 17 and substantially preclude twisting movements of the there-between disposed bread knife. These depending flanges 20 do not extend beyond the major area 10a of the plate member, the minor area 10b thereof being unflanged. In addition, the minor area 10b is relieved or cut back to provide the openings 12 which facilitate transverse insertion of the bread knife blade between the minor plate portion 10b and the underlying portions of the rail spans. Not only do the cut-out openings 12 of the device obviate the need for first disposing the bread knife with its blade in an absolutely horizontal plane, but these openings enable the user to see and guide the blade as it is being inserted in the device.

The modified device illustrated in Fig. 6 of the drawing is functionally identical with the device illustrated in Figs. 1 through 5. This construction is susceptible of fabrication from a single sheet of material by suitable die and punching operations. In this construction, the rails 117 and the depending flanges 120 are constituted by side flanges formed from the same sheet of stock as the plate, which flanges are suitably slotted to snugly accommodate and guide the bread knife blade in its movements beneath the major plate area 10a.

The mode of use of the device illustrated in Figs. 1 through 5 should be self-evident from the foregoing description of its parts. A slice of bread A is first placed flatwise upon the conventional bread-board B, whereupon the device is lifted by its handle 16 and placed thereover so as to bring the usual flat edge of the bread slice into abutment with the block 15. The major area 10a of the plate member will then overlie the entire top surface of the bread slice, whereas the minor area 10b of the plate member is remote therefrom. The conventional bread knife C may then be readily inserted between the minor area 10b and the adjacent rails 17 with its cutting edge facing the bread slide A. The user thereupon applies a slight amount of pressure upon the handle 16, bringing the lower edges of the flanges 13 and 14, as well as of the brackets 18 and 19, into contact with the top surface of the bread-board and placing the bread slice under a slight degree of pressure. The slice-impaling studs 11 superficially penetrate the top surface of the bread slice and further insure against lateral movements thereof relative to the plate area 10a. The knife C is thereupon reciprocated while flatwise disposed upon the spans of the rails 17 and, as manually directed through the bread slice toward the block 15, is maintained against twisting or canting by holding it in contact with the rails 17, the depending side flanges 20 if present, preventing such canting. Upon completion of the cutting operation described, the bread knife is returned to the initial position upon the rails 17, directly beneath the minor area 10b of the plate member and out of contact with the bisected bread slice. The resultant slices are each of one-half original slice-thickness and the cut faces thereof are, if the knife be sharp, as nearly perfect in texture as the faces of the original slice. The blade of the knife having been returned to its initial position beneath the minor plate area 10b, the device, with the knife received therein may be lifted from the bread-board and the slices may be removed. If the bread-board be of considerable size, the slices to be cut may be placed in two positions thereon and the operator may shift the device from one position to the other, substituting fresh slices as the preceding slices are severed. In this manner, production of thin slices at a rapid rate is possible, a feature of considerable advantage over the capability of similar devices of heretofore known design.

The mode of use of the device disclosed in Fig. 6 of the drawing is identical with that shown in Figs. 1 to 5 and need not be set forth.

It will be readily appreciated that devices embodying the concepts of the present invention are characterized by salient advantages over those of the prior art. Our devices may be manufactured at far less cost than heretofore possible, for they require less material and less tool-work. Obviously, the devices may be manufactured, by molding operations, from any of a number of well known plastic materials. Devices embodying my invention are far lighter in weight than those heretofore capable of the same performance. In addition, the construction lends itself to greater compactness than heretofore possible. The foregoing characteristics are especially desirable in case of a device intended for sale or distribution as a premium, since shipping costs, as well as the manufacturing costs, are reduced to a minimum. The device is rugged and this feature, as well as its characteristic compactness, is highly desirable because of the limited space available for storage of kitchen accessories in the modern home. The simplicity of operation of the device, rendering it usable by the most unskilled of domestic help, is another salient feature of advantage.

While we have disclosed two embodiments of the present invention as illustrative of its concepts, obviously such are capable of realization in a wide range of forms. Accordingly, we claim our invention broadly, as indicated by the appended claims.

What we claim is:

1. A unitary rigid bread-board accessory for facilitating the slicing of a conventional slice of bread into two similar slices each of one-half conventional thickness, comprising: a plate member having a major area provided with a roughened flat undersurface adapted for firm direct engagement with the entire top surface of a slice of bread flatly disposed upon the plane surface of an ordinary bread-board and a minor area of an extent adequate to accommodate the blade of a conventional bread knife inserted transversely therebeneath and out of contact with said plate-engaged bread slice, said minor plate area having deeply inwardly-notched side edges defining knife-blade-sighting openings, means integral with said plate member and disposed marginally thereof for directly supporting said plate member from the surface of said bread-board with the bread-slice-engaging surface of said plate member elevated thereabove a fixed uniform distance slightly less than the thickness of the bread slice to be bisected, and guide means integral with said plate member for accurately directing cutting movements of said knife blade along a plane parallel to the undersurface of said major plate area, said guide means comprising a rail extending along each of two opposite side edges of the major portion of said plate member and also across the notched edges of said minor plate area, said rails being attached to said plate member solely at their ends and having their unattached span portions disposed with their top edges in a common plane parallel to and spaced from the undersurface plane of said major plate area a distance substantially one-half the thickness of the bread slice to be bisected, and means for positively insuring flatwise disposition of the bread knife during its bread-slicing movements, said last-mentioned means comprising a shallow flange depending from each opposite side edge of said major plate area uniformly closely spaced from the adjacent rail portion and terminating at the notched side edge of the minor plate area permitting facile insertion of the knife-blade between said rails and said minor plate area.

2. A unitary rigid accessory for use with a knife for slicing a conventional slice of bread into two slices of substantially equal thickness, comprising a flat top plate portion and supporting portions integral with said plate portion and extending downwardly from the side margins of said plate portion adjacent each end thereof, a pair of guide members located one at each side margin of said plate portion each rigidly connecting the supporting portions at its side of said plate portion, each of said supporting portions extending from said plate a distance slightly less than the thickness of a conventional slice of bread and the top surfaces of said guide members lying in a plane parallel to and separated from said plate portion by an amount slightly more than half such distance and defining with said plate portion knife-receiving slots terminating at each end short of the ends of said plate portion, and a multiplicity of projections on said plate portion extending toward the plane defined by the top surfaces of said guide members.

DONALD D. TAYLOR.
ALVIN P. BIXLER.